Aug. 5, 1958 G. PITKANEN 2,845,909
ROTARY PISTON ENGINE
Filed Feb. 18, 1955 3 Sheets-Sheet 1

Gilbert Pitkanen
INVENTOR.

BY *Clarence A. O'Brien*
*and Harvey B. Jackson*
Attorneys

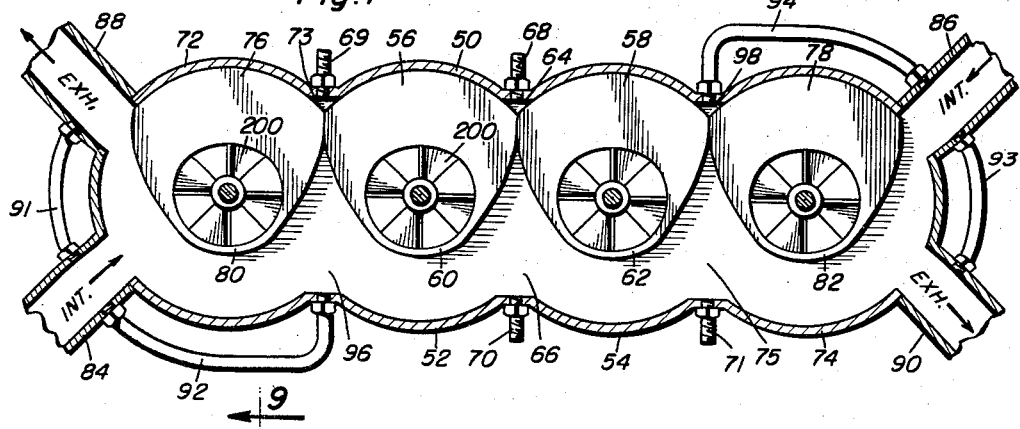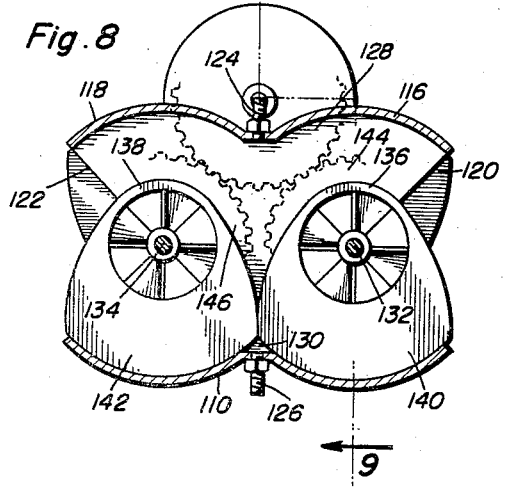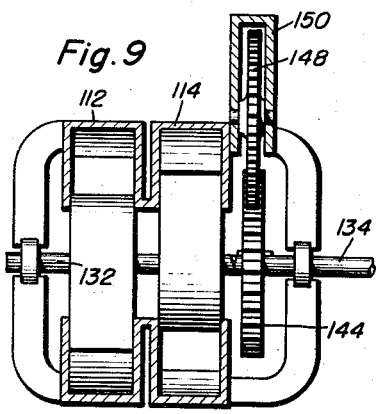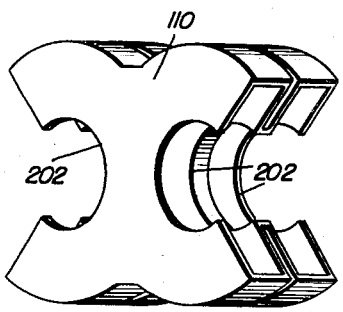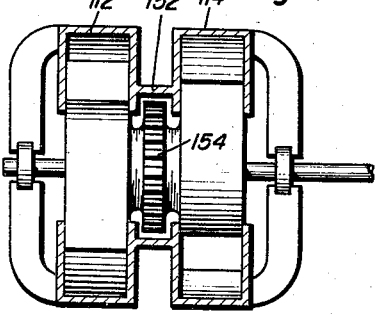
Gilbert Pitkanen
INVENTOR.

Aug. 5, 1958

G. PITKANEN 2,845,909

ROTARY PISTON ENGINE

Filed Feb. 18, 1955

Gilbert Pitkanen
INVENTOR.

BY *Clarence A. O'Brien
and Harvey B. Jacobson*
Attorneys

United States Patent Office 2,845,909
Patented Aug. 5, 1958

2,845,909

ROTARY PISTON ENGINE

Gilbert Pitkanen, Astoria, Oreg.

Application February 18, 1955, Serial No. 489,086

9 Claims. (Cl. 123—12)

This invention comprises novel and useful improvements in a rotary piston engine and more specifically pertains to an improved engine of the two cycle type having complementary coacting continuously rotating pistons.

The principal object of this invention is to provide an internal combustion engine of the two cycle type which shall eliminate all reciprocating masses and substitute therefor continuously rotating members for reducing vibration, enabling increased speed of operation, and affording the possibility of complete counterbalancing of the moving parts.

A further object of the invention is to provide an engine in conformity with the preceding objects which shall have greatly improved cooling of the working chamber and working parts of the engine.

A further object of the invention is to provide an internal combustion engine wherein the moving parts are reduced to a minimum.

Still another object of the invention is to provide a two cycle rotary engine of the rotary piston type wherein multiple cylinders may be readily combined in various advantageous manners.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figures 1–6 relate to a first embodiment of engine, and in which:

Figure 7 is a vertical transverse sectional view showing a modified form of engine;

Figures 8–10 are views showing a third embodiment of engine and in which:

Figure 8 is a vertical transverse sectional view through the stator and rotary pistons of the engine;

Figure 9 is a vertical longitudinal sectional view taken substantially upon the plane indicated by the section line 9—9 of Figure 8 and showing the operating mechanism associated with the pistons of the engine;

Figure 10 is a perspective view of the stator or housing of the engine of Figures 8 and 9;

Figure 11 is a longitudinal sectional view through a still further modified construction of engine;

Figure 1:
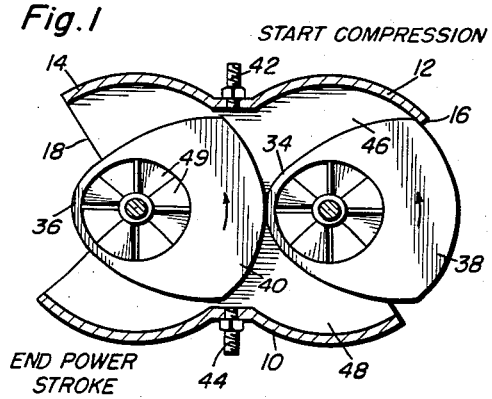
Figure 1 is a diagrammatic view in transverse section through the engine showing the position of the parts at the beginning of the compression stroke for the upper working chamber of the engine.
Figure 2:
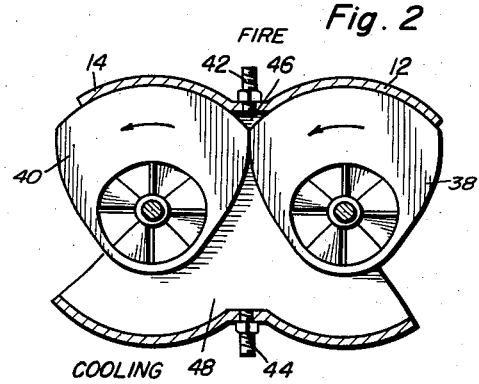
Figure 2 is a diagrammatic view similar to Figure 1 but showing the position of the parts at the completion of the compression stroke and at the ignition point in the upper working chamber of the engine.

In the various embodiments of engines illustrated in the drawings, the same fundamental principles of construction and operation prevail and accordingly it is believed that a detailed explanation of the relatively simple embodiment of Figures 1–6 will assist in understanding the more complex structures of the embodiments of Figures 7–13.

In the embodiment of Figures 1–6, the engine includes a stator or housing member 10 which includes a pair of semi-cylindrical housings or casings 12 and 14 which are joined together and upon opposite sides have openings 16 and 18 respectively to the atmosphere. The cylindrical space within each of the casings 12 and 14 constitutes a chamber or housing in which the rotary pistons are mounted and with which they coact during the operation of the engine.

Figure 6:
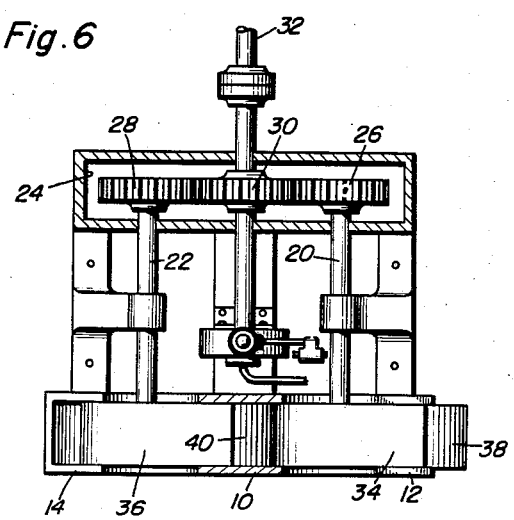
Figure 6 is a view in horizontal section through the embodiment of Figures 1–5 showing the general arrangement of the pistons and their driving mechanism.

Journaled in the stator 10, as shown in Figure 6, are a pair of axles 20 and 22 in parallel relation, provided in a gear housing 24 with a pair of gears 26 and 28 which are connected as by a gear 30 mounted upon a power take-off shaft 32. The axles 20 and 22 extend into the interior of the chambers 12 and 14, and are provided with hollow hubs 34 and 36 from which extend cam-like piston members 38 and 40 respectively. As shown in Figures 1–5, these pistons are adapted to move in close contact with the inner surfaces of the chambers 12 and 14, and also are adapted to move in close contact with the hub portions of each other as will be apparent from a comparison of Figures 1–5. If desired, appropriate sealing means of any desired character may be provided to enhance the effectiveness of the sealing engagement of the pistons with the walls of the chamber in which they rotate, and with each other.

Conveniently positioned at the top and bottom sides of the stator between the casings 12 and 14 and between the two chambers therein are fuel injectors 42 and 44 respectively of any desired character and which are adapted to be supplied by fuel for injection into the working chambers in accordance with the well known diesel cycle of operation, by any suitable mechanism, not shown, and which in itself forms no part of the invention claimed herein.

It is believed that the mode of operation of the engine will now be readily apparent from a study of Figures 1–5. In Figure 1 the pistons are shown in the position at which the compression stroke of the air in the upper chamber 46 begins. At this time, the leading edges of the pistons 38 and 40 have just closed the opening 16 from the atmosphere and the forward or inner edge of the upper wall of the casing 14 and the atmospheric air received in the upper working chamber 46 is now trapped between the pistons 38 and 40 and the upper wall of the casings 12 and 14. As the pistons rotate in the direction indicated by the arrows thereon, it will be apparent that the rearward edges of the cam portions of the pistons will clear the lower edges of the air inlet openings 16 and the forward or inward edge of the bottom wall of the casing 14, permitting exhaust of the previous combustion therein and allowing cooling air to flow into and entirely through the lower chamber 48, until the pistons reach the position shown in Figure 2.

It will be observed at this time the lower chamber 48 has increased to its maximum volume whereby the entire interior of this chamber may be readily cooled by the incoming atmosphere, as well as the adjacent hub portions of both of the pistons. At the same time, the upper chamber 46 has been reduced to a minimum with the charge of air therein compressed to its maximum and the compression stroke is completed, and fuel may be injected from any suitable mechanism not shown through the fuel injector 42 into the compressed air of the upper chamber 46, thereby causing combustion in accordance with the well known two cycle diesel mode of operation. The engine is now ready to begin its power or working stroke for the upper working chamber 46.

Figure 3:
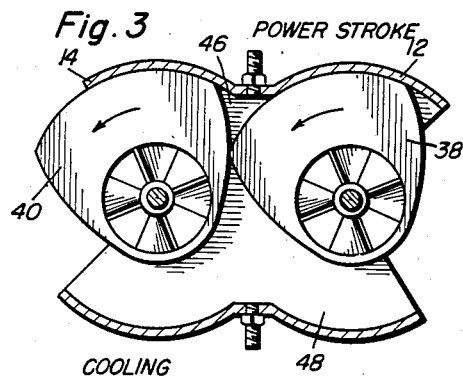
Figure 3 is a view similar to Figure 1 but showing the position of the parts shortly after the start of the power stroke in the upper chamber.

As shown in Figure 3 ignition of the injected fuel has occurred and the working stroke has just begun and the working piston 38 has moved from the casing 12, in which it was disposed on the compression stroke, into the casing 14 for the power stroke. As the chamber 46 now expands the energy of the explosion is converted into work causing rotation of the power shafts 20 and 22 and the power take-off shaft 32. This operation continues until the pistons reach the position of Figure 4, at which time the working chamber 46 has reached its maximum extent, the power stroke is completed, the trailing edges of the pistons 40 and 38 have now cleared the edge 18 and the forward edge of the top wall of the casing 12, permitting exhaust of the combustion products of the chamber 46 and the entry of scavenging and cooling air therethrough, and the leading edges of the pistons have now closed the inlet and outlet of the lower chamber 48, which now begins its compression stroke. It will be also noted that a continuous open passage is provided from the ports 16 to 18 above the pistons 38 and 40. Similarly, in the position of Figure 1, a continuous passage through the engine and below the pistons is provided.

Figure 4:
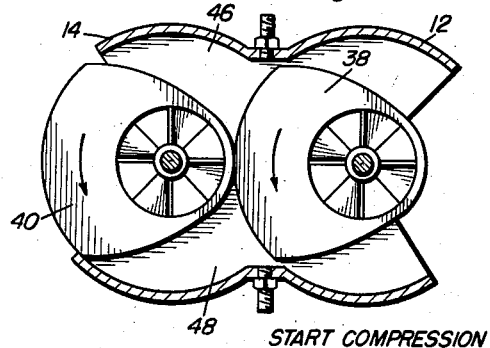
Figure 4 is a view similar to Figure 1 but showing the position of the parts at the end of the power stroke of the upper chamber and at the beginning of the compression stroke of the lower chamber.
Figure 5:
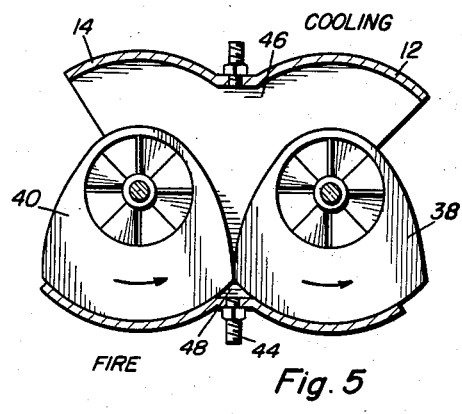
Figure 5 is a view similar to Figure 1 but showing the position of the parts upon the completion of the compression stroke and at the moment of injection of fuel and ignition in the lower working chamber.

Upon continued rotation of the pistons, from the position shown in Figure 4, compression of the air trapped therein continues in the lower chamber 48. As shown in Figure 5, the compression stroke has now been completed in the lower chamber 48, and fuel may now be injected therein through the injection nozzle 44 to initiate combustion and begin the power stroke, while the upper chamber 46 is still open to the atmosphere for maximum cooling effect upon the chamber and the hubs of the pistons exposed therein.

It will be observed that there is thus a continuous uniform rotation of the pistons thereby avoiding the vibrations present in engines having reciprocating parts. The cycle of operation of this engine includes not only the steps of compressing an air charge, fuel injection and ignition, and a power stroke but also cooling and scavenging by air. The hubs 34 and 36 are preferably hollow and are provided with flow tracks 49 therein to provide a flow of cooling air through the pistons.

In the embodiments of Figures 7–11 the same principles of operation referred to in connection with the embodiment of Figures 1–6 are present, together with certain additional modifications and features.

Thus, in the arrangement of Figure 7, the casing or stator 50 includes a pair of semi-cylindrical casings 52 and 54 in which are journaled the working pistons 56 and 58 respectively, these having hollow hubs 60 and 62. Upper and lower working chambers 64 and 66 are provided together with fuel injection nozzles 68 and 70. This portion of the engine may be considered as identical with that of the preceding embodiment as regards the cycle of operation.

However, in this form of the invention there are provided a further pair of casings 72 and 74 disposed on the opposite sides of the casings 52 and 54, and communicating therewith. Journaled in these outer casings are further piston members 76 and 78 having hubs 80 and 82 respectively. The upper and lower portions of the casings 72 and 74 are provided with air inlet conduits 84, 86 and exhaust conduits 88 and 90, respectively. By-pass lines 92 and 94 are provided, the former connecting the air conduit 84 with the lower chamber 96 lying between the pistons 56 and 76, while the by-pass line 94 connects the air conduit 86 with the upper chamber 98 formed between the pistons 58 and 78.

The conduits 84 and 86 constitute air inlet means, while the conduits 88 and 90 comprise exhaust or discharge means. The by-pass lines 92 and 94 constitute scavenging or jumper lines between the intakes and the chambers 96 and 98 respectively.

Also shown in Figure 7 are branch conduits 91 and 93 which respectively conduct air from the inlets 84 and 86 to the exhaust conduits 88 and 90 to facilitate flow in the latter.

The two central cam pistons constitute the working pistons of the engine, while the outer cam pistons function for diverting exhaust gases and for compressing and controlling intake air for the compression strokes of the engine.

It will be noted that additional fuel injectors 69 and 71 have been positioned in the upper working chamber 73, between the pistons 56 and 72 and the lower working chamber 75 between the pistons 58 and 78. The four pistons 72, 56, 58 and 78, in their rotation, provide two air compression chambers 96 and 98, together with four power or working chambers 73, 64, 66 and 75.

In the embodiment of Figures 8–10, a slightly different construction of engine is provided. In this arrangement, the stator 110 provides front and rear power units 112 and 114, arranged as shown in Figure 9. Each unit includes a pair of semi-cylindrical casings 116 and 118, each of which is open to the atmosphere as at 120 and 122, in the same manner as the engine of Figures 1–6. There are also provided the fuel injecting means 124 and 126 for the upper and lower working chambers 128 and 130. Also journaled in the stator, are the parallel axles 132 and 134 to which the hubs 136 and 138 are secured, these having thereon cam-shaped pistons 140 and 142. As so far described, each unit is identical with the embodiment of Figures 1–6. However, the pistons of the two sets of units are preferably disposed at a displacement of 180° with respect to each other in order to secure better balancing of the engine during operation. In addition, each of the axles is provided with a gear 144 and 146 which gears are engaged by a connecting gear 148 disposed in a gear casing 150. Either of the axles may be employed as the power take-off shaft. Shown in Figure 10 is the casing 110 more clearly depicting the front and rear units and semi-cylindrical chambers within each of the units.

The arrangement of Figure 11 is similar to that of Figures 8–10, with the single exception that the previously described front and rear units 112 and 114 are spaced longitudinally from each other sufficiently to provide a gear chamber 152 therebetween for the reception of the gearing assembly connecting the axles together, one of the gears of this assembly being shown at 154. It will be understood that the gearing assembly is identical with any of the forms previously described.

In all of the forms of the invention, it should be observed that each of the hollow hubs of the pistons is provided with fan or propeller blades 200 therein by means of which air may be drawn through the hollow pistons and through registry openings in the stators, such as the openings 202 shown in Figure 10. This arrangement not only lightens the weight of the moving parts of the engine, but also further assists in securing an efficient cooling action thereon and, if desired, exerts a propulsive effect.

Figure 12:
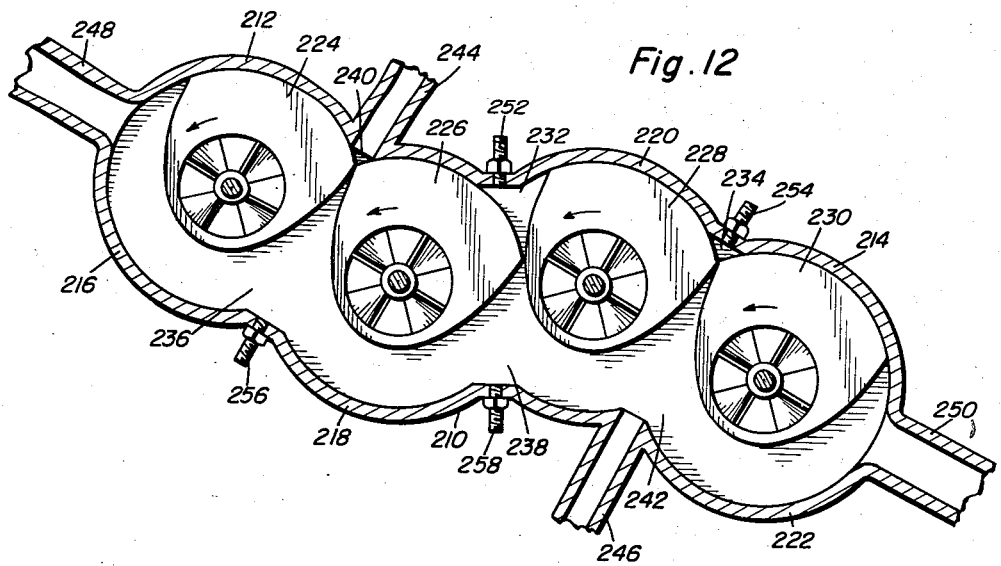
Figure 12 is a view similar to Figure 7 of a further modification showing a staggered cylinder arrangement with a modified intake and exhaust system.

Figure 12 discloses a modification of the embodiment of Figure 7, wherein the stator 210 has two relatively staggered sets 212 and 214 of cylindrical casings. The set 212 has the two cylindrical casings 216 and 218 while the set 214 is provided with two cylindrical casings 220 and 222, all of the cylindrical casings communicating with each other. Pistons 224, 226, 228 and 230 are journaled in these casings to provide upper and lower working chambers 232, 234 and 236, 238 together with air compression chambers 240 and 242. Air supply conduits 244 and 246 communicate with the air compression chambers 240 and 242 and a pair of exhaust conduits 248 and 250 are also provided. Fuel injections 252, 254, 256 and 258 communicate with the working or combustion chambers. The operation of this embodiment is similar to that of Figure 7.

Figure 13:
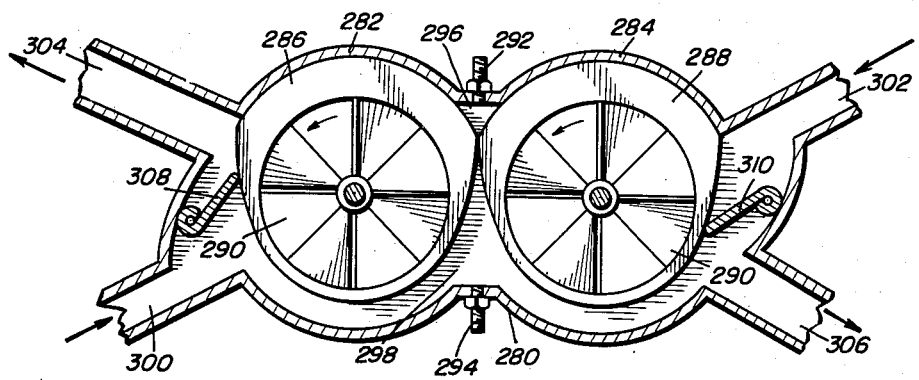
Figure 13 is a view similar to Figure 8 of yet another modification.

In the modified construction of Figure 13, a stator 280 is formed with a pair of cylindrical casings 282, 284 having the rotary cam pistons 286 and 288 therein. The pistons, as shown, have hollow hubs with cooling fans 290 as in the preceding embodiments. Fuel injectors 292 and 294 communicate with the working chambers 296 and 298 while air inlet and exhaust conduits 300, 302 and 304, 306 are also shown. However, oscillatable deflectors or check valves 308 and 310 are provided which allow some of the air to by-pass from the air inlet conduits 300 and 302 into the exhaust conduits 304 and 306 to facilitate flow therethrough, but will prevent any escape of fluid from the exhaust conduits into the intake conduits. It is to be especially noted that the features of the embodiments of Figures 12 and 13 may be used with any of the preceding modifications.

Figure 14:
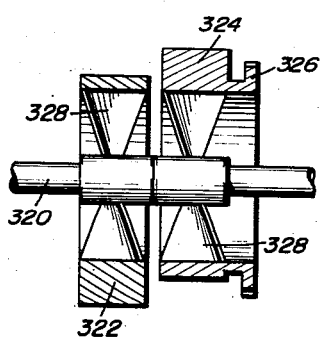
Figure 14 is a view in vertical longitudinal section showing an arrangement of the rotary piston which may be employed with any of the preceding embodiments.

In Figure 14 there is illustrated a further modification, whereby a plurality of units of any of the types hereinbefore set forth may be longitudinally aligned, this construction being somewhat similar to those of Figures 9 and 11. The axle 320 has a pair of cam pistons 322 and 324 thereon with their cam lobes or noses positioned oppositely or at 180° to each other. One of the cam pistons has a gear 326 integral therewith, by which the axle may be connected to other axles or to a common power shaft, as for example, in the manners shown in Figure 6 or 8. The piston hubs are hollow, being provided with air cooling fans 328 for air cooling purposes.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A two cycle rotary piston engine of the diesel type comprising a stator having a pair of semi-cylindrical casings, a rotary piston journaled for rotation in each casing, the adjacent portions of said casings merging into and directly communicating with each other and the opposite portion of the casings having inlet ports communicating with the atmosphere, said pistons contacting and cooperating with each other and with said casings to provide upper and lower working chambers and having lobes controlling said ports, said pistons being relatively timed to provide during their rotation a continuous uninterrupted passage between said ports, means for alternately producing explosions and power strokes in said working chambers, one of said working chambers being open to free flow of air therethrough when ignition occurs in the other working chamber.

2. The combination of claim 1 wherein said pistons have hollow hubs and fan blades therein for inducing an axial flow of cooling air therethrough.

3. The combination of claim 1 wherein each piston is mounted upon an axle, means connecting said axles for rotation in the same direction and at the same speed.

4. The combination of claim 1 wherein said stator includes a plurality of longitudinally spaced sets of casings and pistons.

5. The combination of claim 1 wherein said stator includes a plurality of longitudinally spaced sets of casings and pistons, the casings and pistons of one set being opposite to the pistons of the adjacent set.

6. A two cycle rotary piston engine of the diesel type comprising a stator having a pair of semi-cylindrical adjacent casings, the adjacent portions of said adjacent casings merging into and directly communicating with each other, the opposite portions of said adjacent casings having inlet and outlet ports communicating with the atmosphere, a pair of rotary pistons each journaled for rotation in one of said adjacent casings and being in cooperating engagement with each other, said pair of rotary pistons and said adjacent casings cooperating to provide upper and lower working chambers, means for injecting fuel into each of said working chambers and for alternately producing explosions and working strokes therein, a pair of auxiliary semi-cylindrical casings on opposite sides of said adjacent casings and each directly communicating with said inlet and outlet ports of the adjacent one of said adjacent casings, auxiliary rotary pistons journaled for rotation in said auxiliary casings, an air inlet and an exhaust port in each auxiliary chamber communicating directly with the atmosphere and controlled by the auxiliary piston of their casing, all of said adjacent and auxiliary pistons being timed to provide during their rotation a continuous passage through said casings between the air inlet portions and the exhaust ports of the auxiliary casings.

7. The combination of claim 6 including auxiliary fuel injectors disposed in said stator at the upper side of a working chamber formed between a working piston and its adjacent auxiliary piston and at the lower side of the working chamber formed between the other working piston and the other auxiliary piston.

8. The combination of claim 6 including a by-pass conduit establishing communication between the air inlet port and the exhaust port of an auxiliary casing.

9. The combination of claim 6 including a pair of by-pass conduits, each establishing communication between the intake port of an auxiliary casing and the adjacent working chamber formed by the associated auxiliary piston and the working piston adjacent thereto.

References Cited in the file of this patent

UNITED STATES PATENTS

| 1,953,695 | Walter | Apr. 3, 1934 |
| 2,275,205 | Straub | Mar. 3, 1942 |

FOREIGN PATENTS

| 6,061 | Norway | June 22, 1897 |
| 589,714 | Germany | Dec. 19, 1933 |
| 633,456 | Germany | July 27, 1936 |